(12) United States Patent
Gupta et al.

(10) Patent No.: US 10,492,069 B2
(45) Date of Patent: Nov. 26, 2019

(54) ADVERTISING MULTIPLE SERVICE SET IDENTIFIERS

(71) Applicant: Hewlett Packard Enterprise Development LP, Houston, TX (US)

(72) Inventors: Anil Gupta, Shrewsbury, MA (US); Mili Hoxha, Watertown, MA (US); Souvik Sen, Mountain View, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 162 days.

(21) Appl. No.: 15/500,585

(22) PCT Filed: Sep. 30, 2014

(86) PCT No.: PCT/US2014/058273
§ 371 (c)(1),
(2) Date: Jan. 31, 2017

(87) PCT Pub. No.: WO2016/053292
PCT Pub. Date: Apr. 7, 2016

(65) Prior Publication Data
US 2017/0223536 A1    Aug. 3, 2017

(51) Int. Cl.
| H04L 29/06 | (2006.01) |
| H04W 12/06 | (2009.01) |
| H04L 29/14 | (2006.01) |
| G06F 21/31 | (2013.01) |
| G06Q 30/02 | (2012.01) |

(Continued)

(52) U.S. Cl.
CPC ............ *H04W 12/06* (2013.01); *G06F 21/31* (2013.01); *G06Q 30/02* (2013.01); *H04L 9/32* (2013.01); *H04L 63/0892* (2013.01); *H04L 69/40* (2013.01); *H04W 12/00516* (2019.01)

(58) Field of Classification Search
CPC ....... H04W 12/06; G06F 21/31; G06Q 30/02; H04L 9/32; H04L 63/0892; H04L 69/40
See application file for complete search history.

(56) References Cited

U.S. PATENT DOCUMENTS

| 7,505,596 B2 | 3/2009 | Duplessis et al. |
| 7,634,230 B2 | 12/2009 | Ji et al. |
| 7,941,177 B2 | 5/2011 | Kim |

(Continued)

OTHER PUBLICATIONS

"Retailers Gain Simple, Budget-friendly WLAN Options", May 25, 2011.

*Primary Examiner* — Sarah Su
(74) *Attorney, Agent, or Firm* — Hewlett Packard Enterprise Patent Department

(57) ABSTRACT

Described herein are techniques for selecting a subset of access points. In an example, a wireless access point stores a plurality of unique keys, each unique key being associated with a respective device. The access point advertises a first service set identifier, the first service set identifier requiring authentication of a device requesting connection at a remotely located authentication server. The access point monitors a connection to the remotely located authentication server, and, in response to the connection going down, advertising a second service set identifier, the second service set identifier requiring authentication of a device requesting connection using the unique key associated with the device requesting connection.

19 Claims, 5 Drawing Sheets

(51) Int. Cl.
*H04L 9/32* (2006.01)
*H04W 12/00* (2009.01)

(56) References Cited

U.S. PATENT DOCUMENTS

| | | | |
|---|---|---|---|
| 8,555,344 B1* | 10/2013 | Wiedmann | H04W 12/06 709/225 |
| 8,599,756 B2 | 12/2013 | Yamada | |
| 8,693,986 B2 | 4/2014 | Robertson et al. | |
| 2006/0077986 A1* | 4/2006 | Rune | H04L 63/08 370/401 |
| 2007/0076665 A1* | 4/2007 | Nair | H04W 48/18 370/335 |
| 2007/0208937 A1 | 9/2007 | Cam-Winget et al. | |
| 2008/0025321 A1* | 1/2008 | Gudipudi | H04W 16/00 370/395.53 |
| 2009/0222902 A1 | 9/2009 | Bender et al. | |
| 2010/0074261 A1* | 3/2010 | Muhamed | H04L 12/4662 370/395.3 |
| 2011/0085447 A1 | 4/2011 | Kholaif et al. | |
| 2012/0317619 A1* | 12/2012 | Dattagupta | H04W 12/08 726/4 |
| 2013/0103807 A1 | 4/2013 | Couto et al. | |
| 2014/0047510 A1 | 2/2014 | Belton et al. | |
| 2014/0273958 A1* | 9/2014 | Messana | H04L 63/0884 455/411 |
| 2015/0281236 A1* | 10/2015 | Batta | H04L 63/10 726/4 |

\* cited by examiner

ADVERTISING MULTIPLE SERVICE SET IDENTIFIERS

BACKGROUND

Wireless access points can provide client devices connection to a network. An access point does this by providing access to a wireless local area network (WLAN). The WLAN may be connected to a local area network (e.g., a private network of an enterprise located at a site) and may further provide access to a wide area network, such as the Internet. The wide area network may connect multiple local area networks (e.g., multiple local area networks of an enterprise located at different geographic sites). The access point advertises the WLAN via beacon packets that identify the WLAN by a service set identifier (SSID), which is commonly referred to as the "network name" of the WLAN.

BRIEF DESCRIPTION OF DRAWINGS

The following detailed description refers to the drawings, wherein.

DETAILED DESCRIPTION

Figure 1:
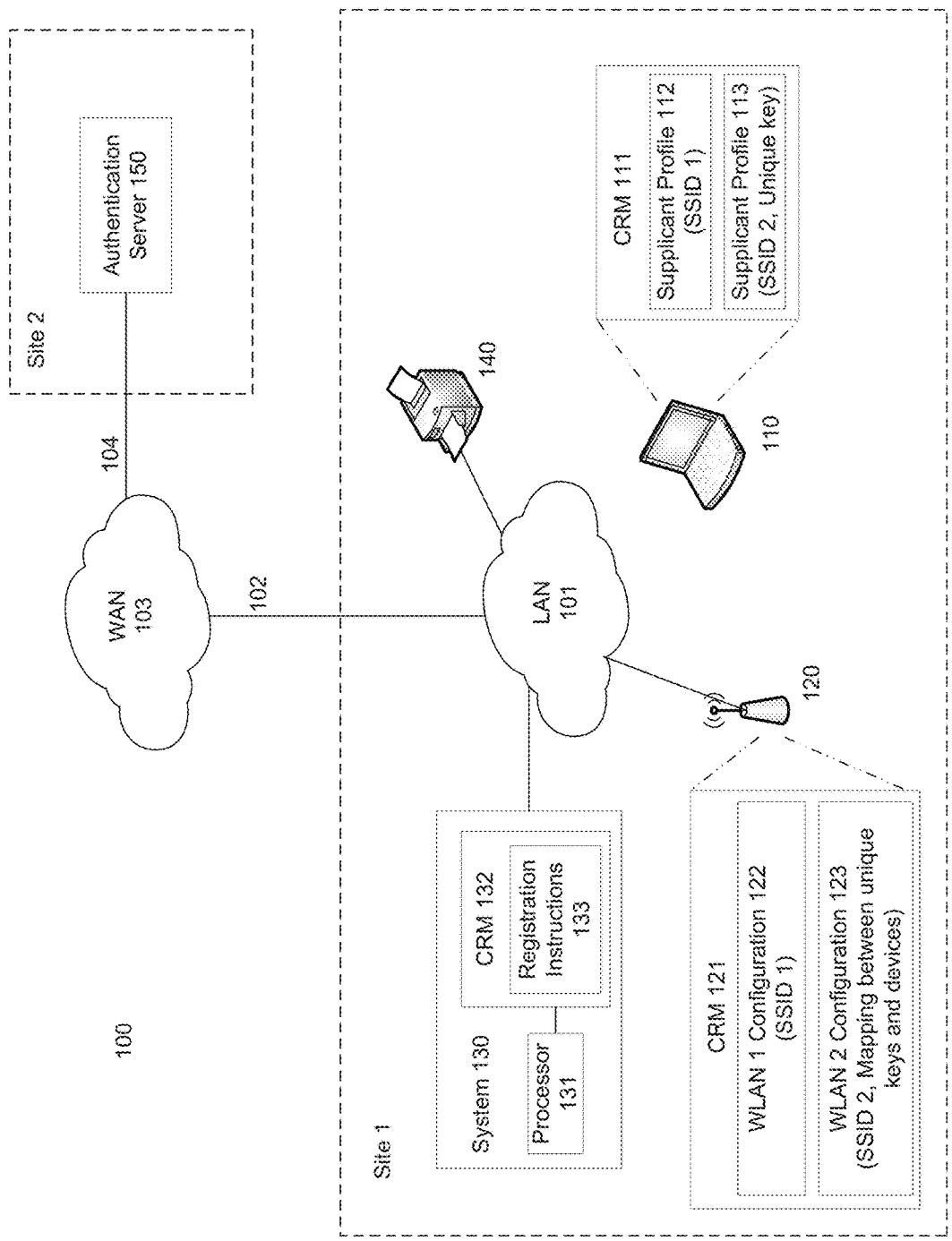
FIG. 1 illustrates an environment in which an access point is configured to advertise two different wireless networks having different authentication features, according to an example.

A common authentication technique for providing access to a wireless local area network (WLAN) is through an authentication server, such as a Remote Authentication Dial-In User Service (RADIUS) server. When the authentication server is located remotely from a first site, such as at a second site (e.g., another company site, a data center), a wide area network (WAN) connection is required between the first site and the authentication server. However, if the connection to the authentication server goes down, the WLAN may be inaccessible at the first site due to the lack of authentication abilities. In such a case, a wireless access point (AP) at the first site will deny requests to connect to the WLAN from client devices because the client devices are unable to be authenticated. This can be frustrating, as such a denial results in the client devices not having wireless access to even a local area network at the first site. As a result, for example, the client devices would be unable to wirelessly print to a printer on the local area network of the first site.

In an example, an AP can advertise one of two different WLANs depending on availability of an authentication server. The AP may store a plurality of unique keys, each unique key being associated with a respective device. For example, the unique keys may be Dynamic Pre-Shared Keys (PSK) or Private Pre-Shared Keys. The access point may advertise a first service set identifier (SSID) corresponding to a first WLAN. The first SSID may require authentication at the remotely located authentication server for any device requesting connection. Connection to the first WLAN may be facilitated using a first supplicant profile stored on the device.

The AP may monitor a connection to the remotely located authentication server. The monitoring may involve monitoring a connection to a wireless controller to which the AP is associated or monitoring a direct WAN connection. In some examples, the AP may determine that a connection to the remotely located authentication server is down based on a lack of response from the authentication server. In other examples, the AP may be notified of a status of the connection to the authentication server.

In response to the connection to the remotely located authentication server going down, the AP may advertise a second SSID corresponding to a second WLAN. The AP may stop advertising the first SSID prior to advertising the second SSID. The second SSID may use a different authentication technique than the first SSID, such as Dynamic PSK or Private PSK. Thus, for example, the second WLAN may require authentication of a device requesting connection using the unique key associated with the device requesting connection instead of using a remotely located authentication server. Connection to the second WLAN may be facilitated using a second supplicant profile stored on the device. Because the unique key is stored on the AP itself, the device may be authenticated even though the connection to the authentication server is down. Accordingly, the AP may be able to provide wireless access to a local area network regardless of whether there is a connection to an authentication server. Furthermore, the AP may be able to do this in a secure way, since the access to the local area network via the second WLAN requires authentication with a device-specific unique key, and in a user-friendly way, since the second supplicant profile is already stored on the client device. Additional examples, advantages, features, modifications and the like are described below with reference to the drawings.

FIG. 1 illustrates an environment in which an access point is configured to advertise two different wireless networks having different authentication features, according to an example. Environment 100 may include a first site (Site 1) and a second site (Site 2) connected by a wide area network (WAN 103). The first site may have a local area network (LAN 101). Connected to LAN 101 at the first site may be an AP 120, a system 130, and a printer 140. AP 120 may be a wireless access point that provide wireless network access to devices. The AP may implement known wireless networking protocols, such as IEEE 802.11 variations. There may be more than one AP at site 1. System 130 may register a device for wireless access, as will be explained later with reference to FIG. 4. In some examples, system 130 may be located remotely from site 1, such as at site 2. A device 110 may also be at the first site, which can connect to LAN 101 via AP 120. Device 110 may be a computer, system, mobile phone, smartphone, tablet computer, laptop computer, or the like, and may include wireless access capability, such as through a wireless card. Site 2 may include authentication server 150. Site 2 may be located outside of LAN 101, but may have its own local area network, of which authentication server 150 is a part. Authentication server may be a server for authenticating client devices attempting to connect to a network. For example, authentication server 150 may be a Remote Authentication Dial-In User Service (RADIUS) server, a Microsoft Active Directory Server, a Lightweight Directory Access Protocol server, or a Terminal Access Controller Access-Control System server, among other examples.

Device 110, AP 120, system 130, printer 140, and authentication server 150 may include one or more controllers and one or more machine-readable storage media. A controller may include a processor and a memory for implementing machine readable instructions. The processor may include at least one central processing unit (CPU), at least one semiconductor-based microprocessor, at least one digital signal processor (DSP) such as a digital image processing unit, other hardware devices or processing elements suitable to retrieve and execute instructions stored in memory, or combinations thereof. The processor can include single or multiple cores on a chip, multiple cores across multiple chips, multiple cores across multiple devices, or combinations thereof. The processor may fetch, decode, and execute instructions from memory to perform various functions. As an alternative or in addition to retrieving and executing instructions, the processor may include at least one integrated circuit (IC), other control logic, other electronic circuits, or combinations thereof that include a number of electronic components for performing various tasks or functions.

The controller may include memory, such as a machine-readable storage medium. The machine-readable storage medium may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium can be computer-readable and non-transitory. Additionally, one or more machine-readable storage media separate from the one or more controllers may be included.

Figure 2:
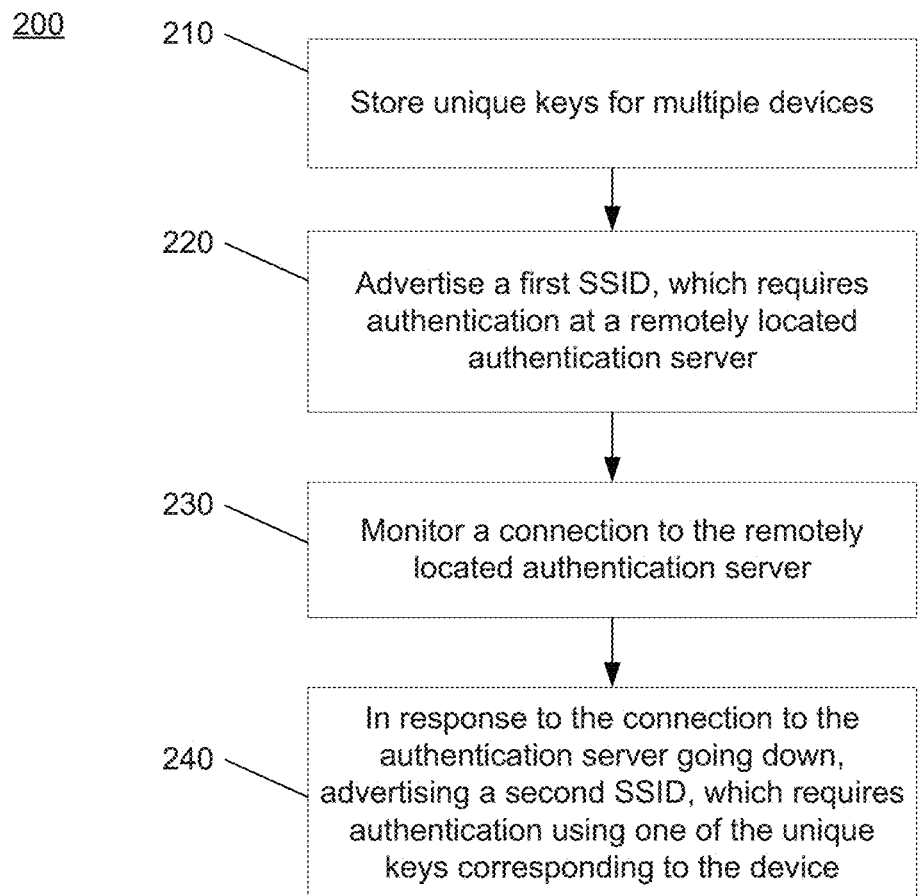
FIG. 2 illustrates a method for an access point to advertise two different wireless networks having different authentication features, according to an example.
Figure 3:
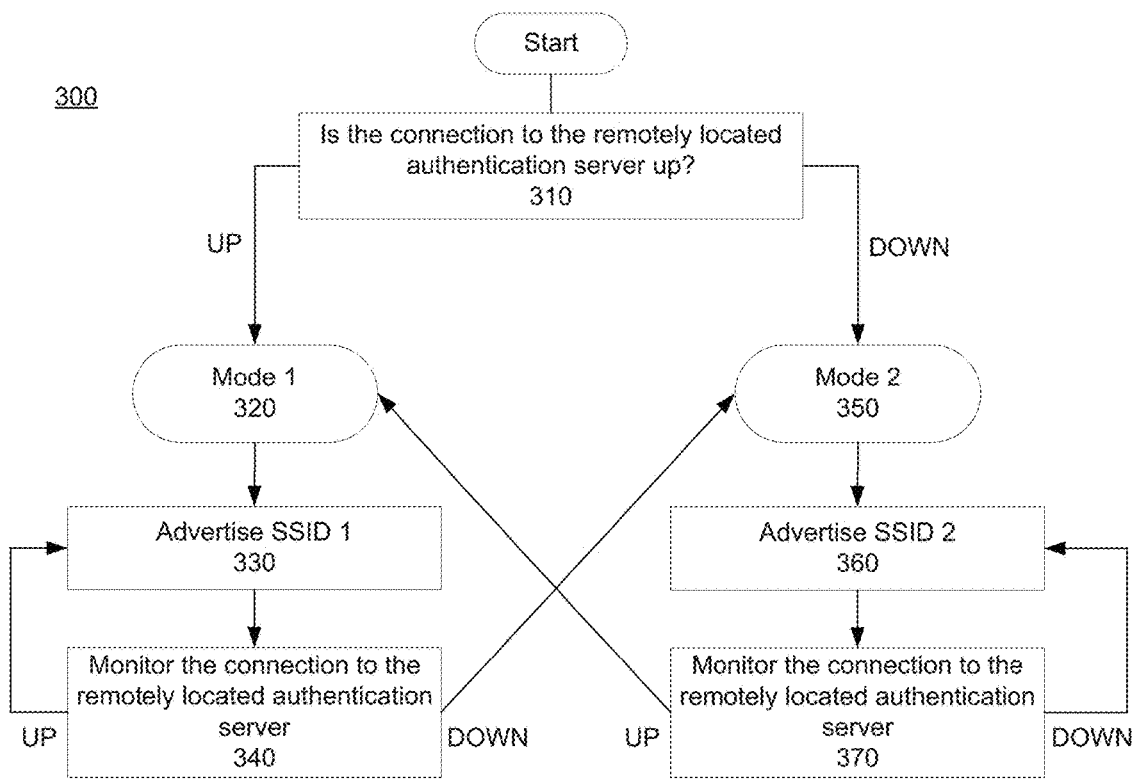
FIG. 3 illustrates a method for an access point to operate in different modes, each mode corresponding to a different wireless network having different authentication features, according to an example.
Figure 4:
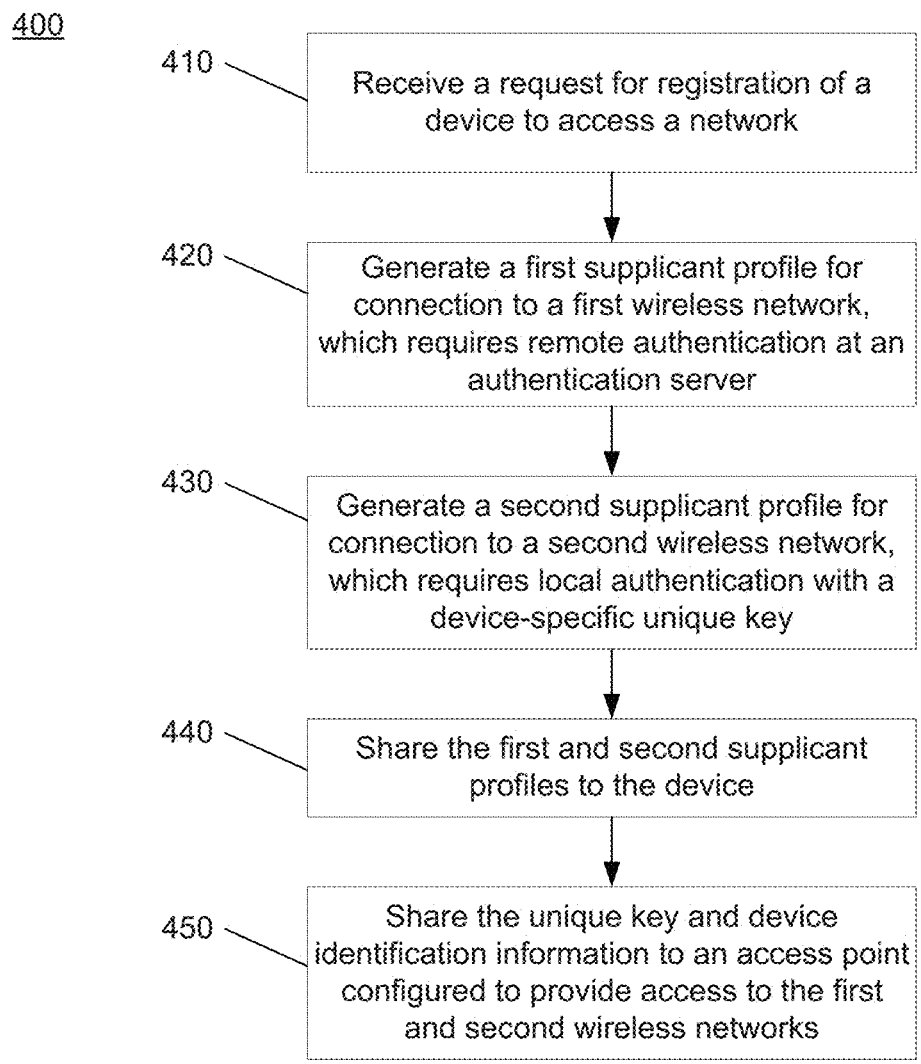
FIG. 4 illustrates a method to register a device for network access through different wireless networks, according to an example.

FIGS. 2-4 illustrate methods usable to advertise two different wireless networks having different authentication features, according to various examples. Methods 200-400 may be performed by a computer. More particularly, methods 200 and 300 may be performed by a wireless access point (AP). Method 400 may be performed by a system, such as a computing device, wireless controller, server, etc., or a combination of these devices, for configuring wireless access. Computer-readable instructions for implementing methods 200-400 may be stored on a computer readable storage medium. These instructions as stored on the medium are referred to herein as "modules" and may be executed by a processor. Methods 200-400 will be described here relative to environment 100 of FIG. 1.

Method 200 may be performed by an AP to advertise two different wireless networks having different authentication features, according to an example. For illustration, method 200 will be described as executed by AP 120. Method 200 may begin at 210, where AP 110 may store unique keys for multiple devices. For example, the unique keys may be Dynamic Pre-Shared Keys (PSK) or Private PSKs. These unique keys may be received by AP 120 from another device that generated them or that is responsible for storing and sharing them. For example, AP 120 may receive the unique keys from system 130. AP 120 may be configured to provide access to two different wireless networks at site 1, WLAN 1 and WLAN 2.

Configuration information 122 for WLAN 1 may be stored in computer-readable medium 121 of AP 120. Among other things, configuration information 122 may include the service set identifier (SSID) for WLAN 1, referred to herein as SSID 1. Configuration information 122 may also store information regarding the authentication technique to be used for devices requesting connection to WLAN 1. The authentication technique required by SSID 1 involves authenticating at remotely located authentication server 150 a device requesting connection to WLAN 1. This authentication technique may be consistent with IEEE 802.1X. Thus, if device 110 desires to connect to WLAN 1, device 110 must be authenticated at authentication server 150.

Configuration information 123 for WLAN 2 may be stored in computer-readable medium 121 of AP 120. Among other things, configuration information 123 may include the SSID for WLAN 2, referred to herein as SSID 2. Configuration information 123 may also store information regarding the authentication technique to be used for devices requesting connection to WLAN 2. The authentication technique required by SSID 2 involves authenticating a device requesting connection using a unique key associated with the device. The unique key may be a key that is specific to the particular device requesting connection and may be stored in association with device identification information corresponding to the particular device. AP 120 may thus store a mapping between unique keys and devices in CRM 121. Each unique key may be a key unique to the device requesting connection and not shared with any other device registered for connection to WLAN 2/AP 120. This authentication technique may be consistent with the Wi-Fi Protected Access (WPA) or Wi-Fi Protected Access II (WPA2) security protocols. For example, the unique key may be a Dynamic Pre-Shared Key (PSK) or a Private PSK. Thus, if device 110 desires to connect to WLAN 2, device 110 must provide a unique key that matches the unique key stored in CRM 121 of AP 120 for device 110.

Method 200 may proceed to block 220. At 220, AP 120 may advertise SSID 1, which requires authentication at the remotely located authentication server 150. Upon receiving a beacon packet corresponding to SSID 1, device 110 may request connection to SSID 1. In particular, device 110 may have a first supplicant profile 112 corresponding to SSID 1. This supplicant profile may have been previously configured on device 110 in a registration process, as will be described later with respect to FIG. 4. Using information in first supplicant profile 112, device 110 may request connection to SSID 1. As part of the authentication process, device 110 may provide AP 120 with authentication information, such as credentials (e.g., a digital certificate, user name and password, or the like). AP 120 may then act as the authenticator and send the credentials to authentication server 150 for authentication of device 110. If the authentication server authenticates device 110, AP 120 may grant device 110 access to WLAN 1. Since this authentication process requires services from authentication server 150, a connection to authentication server 150 is required. In environment 100, this connection is provided by links 102, 104 and networks 101, 103.

At 230, AP 120 may monitor a connection to the remotely located authentication server 150. AP 120 may monitor connectivity to authentication server 150 to detect when authentication services may not be available. Connectivity to authentication server 150 may be disrupted by a problem in links 102, 104 or in networks 101, 103. The monitoring may involve monitoring a connection to a WLAN controller to which AP 120 is associated, which may be the AP's only link to authentication server 150. The wireless controller may be located at site 1, site 2, or another site. The monitoring may also involve monitoring a direct WAN connection (e.g., link 102). In some examples, the AP may determine that a connection to the remotely located authentication server is down based on a lack of response from the authentication server or based on receiving a message returned as "undeliverable". In other examples, the AP may be notified of a status of the connection to the authentication server. This notification may be provided by the AP's WLAN controller, system 130, another AP, or another device.

At 240, in response to the connection to the authentication server going down, AP 120 may advertise the SSID 2 corresponding to WLAN 2, which requires authentication using a unique key associated with a particular device requesting connection. Because the unique keys are stored in CRM 121 as part of configuration information 123, a device requesting connection can be authenticated even though the authentication server 150 is unreachable.

Prior to advertising SSID 2, AP 120 may stop advertising SSID 1. In particular, in response to the connection to authentication server 150 going down, AP may stop advertising SSID 1. In this way, AP 120 can ensure that only one of SSID 1 and SSID 2 is advertised at any given time. Devices previously connected to SSID 1, such as device 110, may detect that SSID 1 is no longer active and will disconnect from SSID 1. The devices may then scan for new networks and will detect the newly advertised SSID 2. Upon receiving a beacon packet corresponding to SSID 2, device 110 may request connection to SSID 2. In particular, device 110 may have a second supplicant profile 113 corresponding to SSID 2. This supplicant profile may have been previously configured on device 110 in a registration process, as will be described later with respect to FIG. 4. Using information in second supplicant profile 113, device 110 may request connection to SSID 2. As part of the authentication process, device 110 may provide AP 120 with authentication information, such as the unique key stored in CRM 111. AP 120 may compare the unique key provided by device 110 with a unique key stored in CRM 121 corresponding to device 110. If the keys do not match, or if there is no unique key associated with device 110 in CRM 121, AP 120 may deny access to WLAN 2. If the keys match, AP may authenticate device 110 and provide device 110 with access to WLAN 2. Accordingly, AP may provide access to a wireless network even when a connection to a remotely located authentication server is down.

In some examples, WLAN 2 may provide limited access relative to WLAN 1. For example, while WLAN 1 may provide unimpeded access to LAN 101 and WAN 103 (including potentially access to other LANs associated with the enterprise), WLAN 2 may only provide access to LAN 101. Furthermore, WLAN 2 may be configured to only provide access to certain devices, such as certain devices on LAN 101. For instance, WLAN 2 may provide access only to devices such as printer 140. The networks may be configured this way due to security concerns regarding the authentication method used for each one. For instance, the authentication method for WLAN 1 may be viewed as more secure than the authentication method of WLAN 2 since WLAN 1 requires authentication using an authentication server.

Turning to FIG. 3, method 300 may be performed by an AP to advertise two different wireless networks having different authentication features, according to an example. For illustration, method 200 will be described as executed by AP 120. In particular, method 300 illustrates that AP 120 may operate in two different modes depending on the status of a connection to remotely located authentication server 150. Method 300 is described here without going into the implementation details already described with respect to method 200.

At 310, method 300 may begin by determining whether the connection to the remotely located authentication server 150 is up. If the connection is up, AP operates in mode 1 (block 320). If the connection is down, AP 120 operates in mode 2 (block 350).

In mode 1, AP 120 advertises SSID 1 (block 330). As before, SSID 1 uses an authentication method that involves a remotely located authentication server 150. AP 120 then monitors the connection to the remotely located authentication server 150 (block 340). If the connection to the authentication server 150 remains up, method 300 continues to advertise SSID 1 and monitor the connection to the authentication server 150. If the connection to the authentication server 150 goes down, method 300 transitions to mode 2 (block 350).

In mode 2, AP 120 advertises SSID 2 (block 350). As before, SSID 2 uses an authentication method that involves a unique, device-specific key stored on AP 120. AP 120 then monitors the connection to the remotely located authentication server 150 (block 370). If the connection to the authentication server 150 remains down, method 300 continues to advertise SSID 2 (block 360) and monitor the connection to the authentication server 150. If the connection to the authentication server 150 goes back up, method 300 transitions to mode 1 (block 320). In some examples, method 300 does not transition from mode 2 to mode 1 unless determined that the connection to the authentication server is up and is stable. In an example, stability of the connection may be measured by the length of time that the connection has been back up. Other measures of connection stability may be used, as well.

FIG. 4 illustrates a method to register a device for network access through different wireless networks, according to an example. For illustration, method 400 will be described as executed by system 130 in environment 100. As mentioned previously, system 130 may include a computing device, wireless controller, server, etc., or a combination of these devices, for configuring wireless access. System 130 may be located at site 1, as shown in FIG. 1, or remotely to site 1, such as at site 2 or another site. System 130 may include a processor 131 and a computer-readable medium 132. CRM 132 may include registration instructions 133. System 130 may also include a communication interface for sending and receiving messages, such as via LAN 101.

Method 400 may begin at 410, where system 130 may receive a request for registration of a device to access a network. The device requesting registration may be device 110. The request may be received from device 110 upon physically connecting to LAN 101, such as via a wired connection, and requesting registration. At 420, system 130 may generate a first supplicant profile (e.g., supplicant profile 112) for connection to a first wireless network (e.g., WLAN 1). As previously described, the first wireless network may require remote authentication at authentication server 150. At 430, system 130 may generate a second supplicant profile (e.g., supplicant profile 113) for connection to a second wireless network (e.g., WLAN 2). As previously described, the second wireless network may require authentication at AP 120 using a unique key (e.g., Dynamic or Private PSK).

At 440, the first and second supplicant profiles may be shared with device 110. The supplicant profiles may be shared with device 110 by sending or pushing them to the device using the Group Policy Object feature in a Microsoft® Active Directory environment. In other examples, the supplicant profiles may not be generated and/or shared at the same time, and may be shared using other techniques. For example, the unique key may be shared with device 110 via a secure web page or via email to a user of device 110. In such a case, the user or an administrator would be able to manually configure the second supplicant profile with the unique key. In another example, the unique key and other configuration information could be shared with device 110 via a downloadable executable file, such as a Java application. The application could be run by device 110 and automatically configure the second supplicant profile on device 110.

At 450, the unique key and device identification information for device 110 may be shared with an access point configured to provide access to the first and second wireless networks. Thus, system 130 may share this information with AP 120. If there are multiple APs at site 1, system 130 may share this information with all such APs. This would enable device 110 to be able to connect to any AP in site 1. This information may be shared with AP 120 (or any other APs) by a WLAN controller controlling AP 120 while a link between the AP and WLAN controller is up. Over time, as multiple devices register for wireless network access, system 130 may share with AP 120 this information for all such devices. In practice, this information may be shared with AP 120 for all devices that are expected to be at site 1. For example, this information may be shared for all devices pertaining to users that work at site 1.

Figure 5:
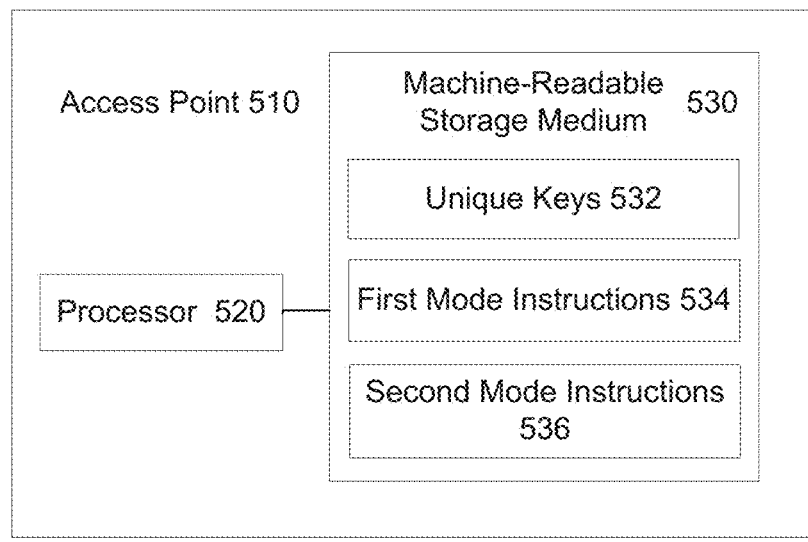
FIG. 5 illustrates a computer-readable medium with instructions for an access point to advertise two different wireless networks having different authentication features, according to an example.

FIG. 5 illustrates a computer-readable medium with instructions for an access point to advertise two different wireless networks having different authentication features, according to an example. Access point (AP) 510 may provide access to a local area network (e.g., LAN 101) via a wireless network (e.g., WLAN 1 and WLAN 2). For example, AP 510 may correspond to AP 120 in environment 100 of FIG. 1. AP 510 may include one or more controllers and one or more machine-readable storage media, as described with respect to AP 120, for example.

Processor 520 may be at least one central processing unit (CPU), at least one semiconductor-based microprocessor, other hardware devices or processing elements suitable to retrieve and execute instructions stored in machine-readable storage medium 530, or combinations thereof. Processor 520 can include single or multiple cores on a chip, multiple cores across multiple chips, multiple cores across multiple devices, or combinations thereof. Processor 520 may fetch, decode, and execute instructions 534, 536 among others, to implement various processing. As an alternative or in addition to retrieving and executing instructions, processor 520 may include at least one integrated circuit (IC), other control logic, other electronic circuits, or combinations thereof that include a number of electronic components for performing the functionality of instructions 534, 536. Accordingly, processor 520 may be implemented across multiple processing units and instructions 534, 536 may be implemented by different processing units in different areas of AP 510.

Machine-readable storage medium 530 may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium 530 can be computer-readable and non-transitory. Machine-readable storage medium 530 may be encoded with a series of executable instructions for managing processing elements.

The instructions 534, 536 when executed by processor 520 (e.g., via one processing element or multiple processing elements of the processor) can cause processor 520 to perform processes, for example, methods 200 and 300, and/or variations and portions thereof.

For example, first mode instructions 534 may cause processor 520 to, in a first mode, advertise a first service set identifier (e.g., SSID 1) corresponding to a first wireless network (WLAN 1). The first service set identifier may require authentication of a device requesting connection (e.g., device 110) at a remote authentication server (e.g., authentication server 150) located outside the local area network (e.g., LAN 101). Second mode instructions 536 may cause processor 520 to switch to a second mode in response to the connection to the remote authentication server going down. This connection may be monitored by AP 510. In the second mode, processor 520 may advertise a second service set identifier (e.g., SSID 2) corresponding to a second wireless network (e.g., WLAN 2). The second service set identifier may require authentication of a device requesting connection (e.g., device 110) using a unique key associated with the device requesting connection. The unique key for the device may be stored in storage medium 530 as part of unique keys 532. The unique key may be stored in association with device identification information for the device. The unique key may be a Dynamic PSK or Private PSK.

In some examples, the second wireless network (e.g., WLAN 2) may provide limited access relative to the first wireless network (e.g., WLAN 1). For example, while the first wireless network may provide unimpeded access to the local area network (e.g., LAN 101) and other networks (e.g., the Internet, other local area networks associated with the local area network), the second wireless network may only provide access to the local area network. Furthermore, the second wireless network may be configured to only provide access to certain devices, such as certain devices on the local area network. For instance, the second wireless network may provide access only to devices such as a printer (e.g., printer 140). The networks may be configured this way due to security concerns regarding the authentication method used for each one. For instance, the authentication method for the first wireless network may be viewed as more secure than the authentication method of the second wireless network since the first wireless network requires authentication using an authentication server.

In the foregoing description, numerous details are set forth to provide an understanding of the subject matter disclosed herein. However, implementations may be practiced without some or all of these details. Other implementations may include modifications and variations from the details discussed above. It is intended that the appended claims cover such modifications and variations.

What is claimed is:

1. A method comprising, by a processor of a wireless access point:

storing, at the wireless access point, a plurality of unique keys, each unique key being associated with a respective device;

advertising a first service set identifier, the first service set identifier requiring authentication, at a remotely located authentication server, of a device requesting connection to a first wireless network associated with the first service set identifier at a remotely located authentication server;

monitoring a connection to the remotely located authentication server; and in response to the connection to the remotely located authentication server going down, advertising a second service set identifier, the second service set identifier requiring authentication, at the wireless access point, of the device requesting connection to a second wireless network associated with the second service set identifier, wherein the wireless access point authenticates the device by using the unique key associated with the device requesting connection to the second wireless network.

2. The method of claim 1, wherein the connection to the remotely located authentication server is a wide area network connection.

3. The method of claim 1, wherein the wireless access point is located at a first site on a local area network, the remotely located authentication server is located at a second site outside of the local area network, and the device requesting connection is located at the first site.

4. The method of claim 1, wherein only one of the first service set identifier and the second service set identifier is advertised at any given time.

5. The method of claim 1, wherein in response to the connection to the remotely located authentication server going down, the device stops advertising the first service set identifier.

6. The method of claim 1, further comprising:
while the second service set identifier is being advertised, monitoring the connection to the remotely located authentication server; and
in response to the connection to the remotely located authentication server coming back up, stopping the advertising of the second service set identifier and starting to advertise the first service set identifier.

7. The method of claim 6, wherein the connection to the remotely located authentication server is determined to be back up when the authentication server can be reached and the connection is stable.

8. The method of claim 1, further comprising:
receiving first authentication information from the device requesting connection when the first service set identifier is being advertised, the first authentication information deriving from a first supplicant profile stored on the device requesting connection; and
receiving second authentication information from the device requesting connection when the second service set identifier is being advertised, the second authentication information deriving from a second supplicant profile stored on the device requesting connection.

9. The method of claim 1, wherein the unique keys are Dynamic Pre-Shared Keys or Private Pre-Shared Keys.

10. The method of claim 1, wherein the remotely located authentication server is a Remote Authentication Dial-In User Service (RADIUS) server, a Microsoft Active Directory server, a Lightweight Directory Access Protocol server, or a Terminal Access Controller Access-Control System server.

11. A system comprising:
a communication interface; and
a processor to:
receive, via the communication interface, a request for registration of a device to access a network;
generate a first supplicant profile for connection to a first wireless network, the first supplicant profile requiring authentication of the device, at a remotely located authentication server, to connect to the first wireless network;
generate a second supplicant profile for connection to a second wireless network, the second supplicant profile including a unique key for authenticating the device, at a local access point, to connect to the second wireless network:
share, via the communication interface, the first and second supplicant profiles with the device; and
share, via the communication interface, the unique key and identification information of the device with the local access point configured to provide access to the first and second wireless network based on the remotely located authentication server authenticating the device and to, in response to a connection from the local access point to the remotely located authentication server going down, provide access to the second wireless network based on the local access point authenticating the device via the unique key, the unique key being unique to the device and not shared with any other devices registered with the access point.

12. The system of claim 11, wherein the first and second supplicant profiles are sent to the device using Group Policy Object feature in an Active Directory environment.

13. The system of claim 11, wherein the unique key of the second supplicant profile is a Dynamic Pre-Shared Key or a Private Pre-Shared Key.

14. The system of claim 11, the processor to share, via the communication interface, the unique key and identification information of the device with all access points at a site that are configured to provide access to the first and second wireless networks.

15. A non-transitory computer-readable storage medium storing instructions for execution by a processor of an access point that provides access to a local area network, the instructions when executed causing the processor to:
store a plurality of unique keys, each unique key being associated with a respective device;
in a first mode, advertise a first service set identifier, the first service set identifier requiring authentication, of a device requesting connection at a remote authentication server located outside the local area network, of a device requesting connection to a first wireless network associated with the first service set identifier; and
in response to the remote authentication server becoming unreachable or unresponsive, switch to a second mode and advertise a second service set identifier, the second service set identifier requiring authentication, at the access point, of the device requesting connection to a second wireless network associated with the second service set identifier, wherein the access point authenticates the device by using the unique key associated with the device requesting connection to the second wireless network.

16. The storage medium of claim 15, wherein the unique keys are Dynamic Pre-Shared Keys or Private Pre-Shared Keys.

17. The storage medium of claim 15, wherein a wireless network corresponding to the second service set identifier has limited access relative to a wireless network corresponding to the first service set identifier.

18. The storage medium of claim 17, wherein the wireless network corresponding to the second service set identifier provides access only to the local area network.

19. The storage medium of claim 18, wherein the wireless network corresponding to the second service set identifier provides access only to certain devices on the local area network.

* * * * *